Jan. 29, 1924.
E. H. SHERBONDY
STEERING GEAR
Filed April 20, 1921  2 Sheets-Sheet 1
1,482,155
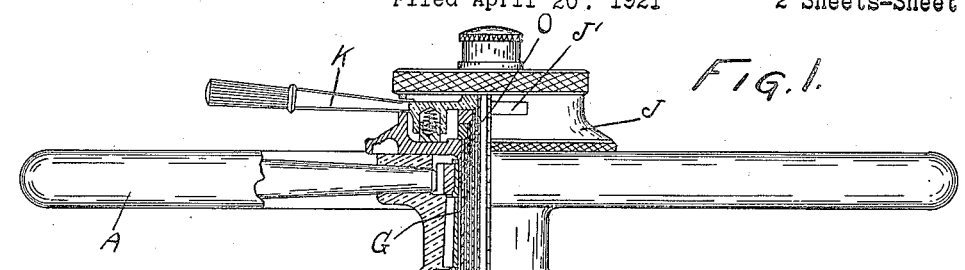
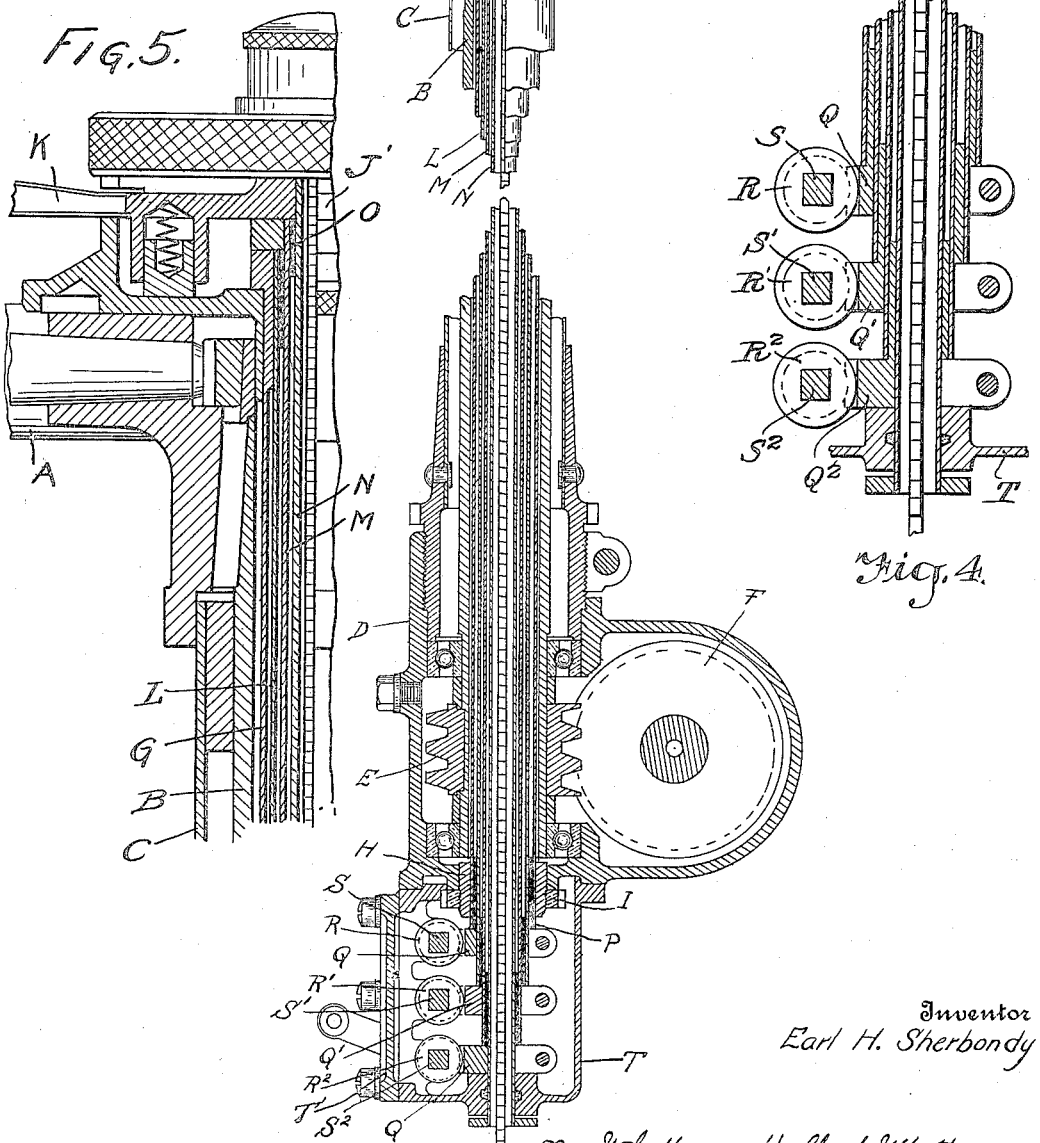
Inventor
Earl H. Sherbondy
By Whittemore Hulbert Whittemore
& Belknap   Attorneys Patented Jan. 29, 1924.

1,482,155

UNITED STATES PATENT OFFICE.

EARL H. SHERBONDY, OF DETROIT, MICHIGAN, ASSIGNOR TO SIDNEY D. WALDON, OF DETROIT, MICHIGAN.

STEERING GEAR.

Application filed April 20, 1921. Serial No. 463,003.

*To all whom it may concern:*

Be it known that I, EARL H. SHERBONDY, a citizen of the United States of America, residing at Detroit, in the county of Wayne and State of Michigan, have invented certain new and useful Improvements in Steering Gears, of which the following is a specification, reference being had therein to the accompanying drawings.

The invention relates to steering gears designed for use on motor vehicles, and has for its object a construction in which the controls are conveniently mounted thereon. Its further object is to increase the number of controls so mounted without increasing the dimensions of the steering stem. It has a further object to obtain a simple construction of mechanism, and further to obtain various advantages as hereinafter set forth.

In the drawings,—

Figure 1, is a sectional elevation of the steering gear.

Figure 4 is an enlarged detail sectional view of the lower end of the steering column with the housing removed.

Figure 5 is an enlarged detail sectional view of the upper end of the steering column and showing parts in elevation.

Figure 3:
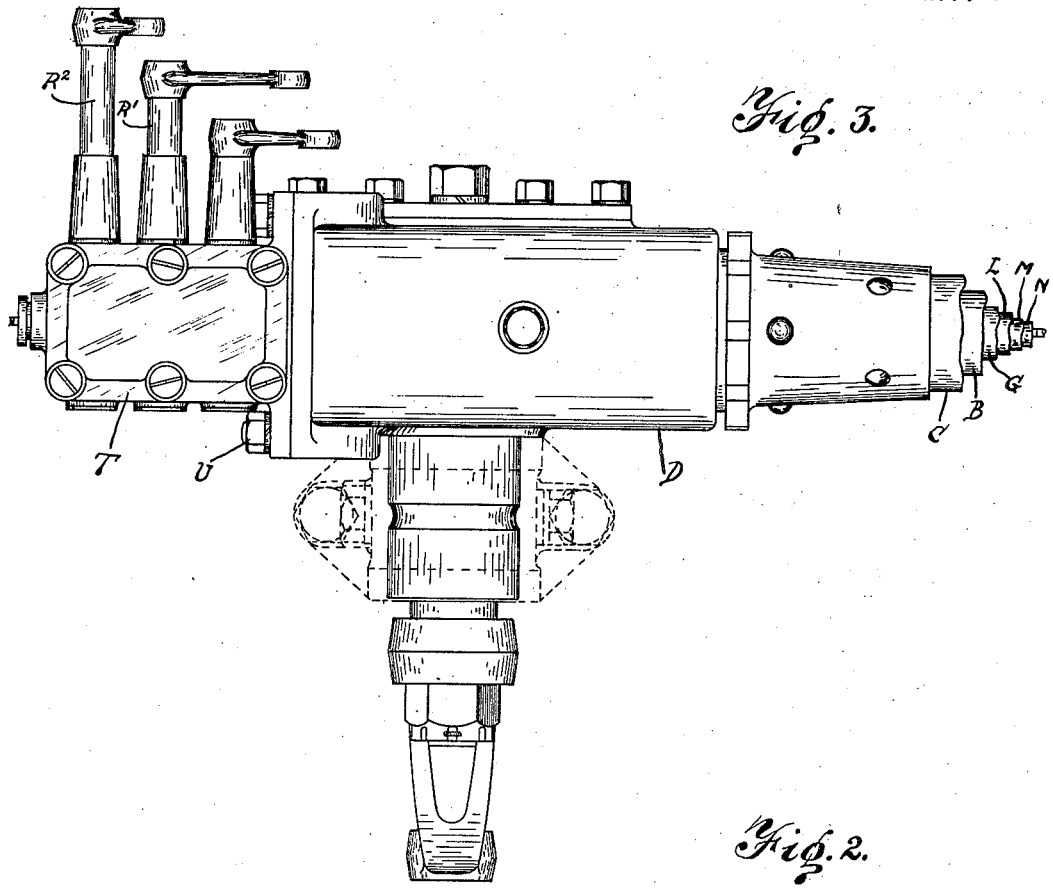
Figure 3, is a side elevation of a portion of the gear.
Figure 2:
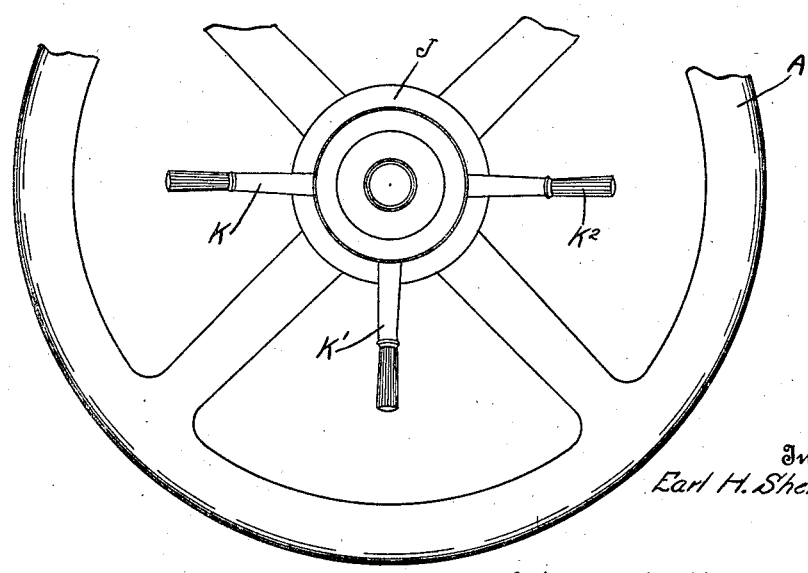
Figure 2, is a plan view thereof.

In the present state of the art it is usual to mount upon steering wheels the throttle control and spark control levers, but where there are other adjustments, such, for instance, as the control of the richness of the mixture, the levers are usually mounted upon the dash.

The difficulty of increasing the number of controls which are mounted centrally upon the wheel is that the mechanical transmission therefrom must pass through the center of the steering stem, and it is desirable to avoid an increase in the diameter of this stem.

Another difficulty is that it is usually necessary to arrange the speed control levers in different planes so as to provide for the attachment of the same respective to shafts concentrically arranged; thus, a large number of these levers will increase the distance which they extend from the plane of the wheel.

Still other difficulties are to provide suitable transmission from the shafts passing through the steering stem and the mechanisms that are controlled thereby.

With my improved construction the several controls are all arranged in the same plane but are angularly spaced from each other; each control has an angular movement limited so as not to interfere with that of an adjacent control.

The control levers are mounted upon telescopically engaged tubular shafts which pass centrally through the steering stem by means of hubs, which form spacers between the telescopic shafts. At their lower ends these tubular shafts have mounted thereupon worm wheel segments which are clamped in position and are provided with hub portions forming spacers for the tubular shafts. The worm gears engage upon rock shafts which extend transversely to the steering stem and together with the worm wheels are completely housed in a casing mounted at the lower end of said stem.

In detail, A is the steering wheel which is mounted at the upper end of a revoluble steering stem B enclosed within the non-revoluble stem or housing C secured at its lower end to a housing D, which encloses the worm E and worm wheel F. G is a non-revoluble tube arranged within the revoluble stem B and at its lower end fixedly secured to the housing D by means of the bushing H and lock nut I. At the upper end of the tube G is mounted a non-revoluble housing J for the control levers, which is peripherally cut away at J' for the passage of the several control levers K, K' and K². As shown, these levers are angularly spaced from each other and each has the freedom for angular adjustment sufficient to operate its control mechanism without interference with the adjacent levers which are in the same plane.

Within the non-revoluble tube G are telescopically arranged the tubular control shafts L, M and N, the adjacent ends of which are in stepped relation. These tubes are spaced from each other at their upper ends by the hubs O of the levers K, K' and K², and these hubs are cut away so as to provide freedom for movement of adjacent levers. At their lower ends the tubes L, M and N are spaced from each other by hubs P of worm gear segments Q, Q' and Q² mounted on the stepped ends of said tubes. These worm gear segments are in mesh with worm gears R, R', R² on rock shafts S, S' and S², which latter are journaled in a housing T detachably mounted at the lower end of the housing D. The housing T has a detachable cover T', which when removed permits of disengaging the rock shafts and worms.

The construction as described is one which may be easily assembled and in which the various parts are compactly arranged. The control levers being all arranged in the same plane, can be placed close to the steering wheel, where they are easily operated and each can be adjusted without interference with the others.

What I claim as my invention is:

1. In a steering gear, the combination with a tubular steering stem, of a plurality of tubular control shafts telescopically engaging said stem, control levers secured to the respective control shafts and in the same plane, and hubs for said control levers forming spacers between the several tubular shafts, said hubs being cut away to permit a limited independent movement of each lever.

2. In a steering gear, the combination with a tubular steering stem, of a plurality of tubular control shafts telescopically engaging said tubular stem, control levers mounted on the respective control shafts, said levers being arranged in the same plane and each having a hub forming a spacer between its shaft and the adjacent tubular shaft, said hub being cut away to permit a limited independent angular movement of each lever, the lower ends of said control shafts being stepped in relation to each other, and gear segments mounted on the stepped portions of said tubes and having hubs forming spacers between said tubes.

3. A steering gear, the combination with a tubular steering stem, of a plurality of tubular control shafts telescopically engaging said stem, said shafts having their opposite ends in stepped relation, control levers mounted on the stems at the upper end of said shafts, said levers being arranged in different segments of the same plane of rotation and each lever having a hub forming a spacer between its shaft and an adjacent shaft, being cut away to permit a limited angular movement of the other levers, and gears mounted on the stepped lower ends of the shaft having hubs forming spacers between said shafts.

4. In a steering gear, the combination with a steering stem and a wheel mounted thereon, of a non-revoluble tube extending through said stem and fixedly secured at its lower end, a housing mounted on said tube above said steering wheel and having a segmental slot in its periphery, a plurality of control levers extending out from said housing through said segmental slot, each having a limited angle of adjustment without interference with the other levers, and tubular control shafts telescopically engaging said non-revoluble tube and secured to the respective control levers.

5. In a steering gear, the combination with a steering stem, of a wheel mounted thereon, a non-revoluble tubular housing enclosing said steering stem, a non-revoluble tube within said steering stem and extending therethrough, of means for connecting the lower end of said non-revoluble inner tube with said non-revoluble outer casing, a housing mounted at the upper end of said non-revoluble inner tube adjacent to said steering wheel and having a segmental slot in its periphery, a plurality of control levers extending outward through said slot in different segments thereof and each having an angular adjustment without interference with the other levers, tubular control shafts telescopically engaged with each other and with said inner non-revoluble tube, hubs on the respective control shafts, said hubs forming spacers between adjacent shafts and being cut away to permit of the independent angular adjustment of the levers, gears mounted on the lower ends of the respective control shafts having hubs forming spacers between adjacent tubes, and cooperating gears for transmitting the movement of said shafts to the respective control mechanisms.

6. In a steering gear, the combination with a tubular steering stem, of a plurality of control shafts telescopically engaging said stem, control levers secured to the respective control shafts and in the same plane, and hubs for said control levers forming spacers between the several shafts and provided with means for permitting a limited independent movement of each lever.

7. In a steering gear, the combination with a tubular steering stem, of a plurality of tubular control shafts telescopically engaging said stem control levers secured to the respective control shafts, and gear segments mounted on said shafts and having hubs forming spacers between the same.

In testimony whereof I affix my signature.

EARL H. SHERBONDY.